United States Patent
Chua et al.

(10) Patent No.: US 7,289,131 B2
(45) Date of Patent: Oct. 30, 2007

(54) METHOD OF RENDERING A GRAPHICS IMAGE

(75) Inventors: Gim Guan Chua, Singapore (SG); Luis Serra, Singapore (SG); Hern Ng, Singapore (SG)

(73) Assignee: Bracco Imaging S.p.A., Milan (IT)

( * ) Notice: Subject to any disclaimer, the term of this patent is extended or adjusted under 35 U.S.C. 154(b) by 0 days.

(21) Appl. No.: 10/451,485

(22) PCT Filed: Dec. 22, 2000

(86) PCT No.: PCT/SG00/00200

§ 371 (c)(1),
(2), (4) Date: Nov. 10, 2003

(87) PCT Pub. No.: WO02/052506

PCT Pub. Date: Jul. 4, 2002

(65) Prior Publication Data

US 2004/0075657 A1    Apr. 22, 2004

(51) Int. Cl.
G06T 15/00 (2006.01)
G06T 17/00 (2006.01)
G06T 15/30 (2006.01)
G06T 17/20 (2006.01)
G09G 5/00 (2006.01)
A61B 5/05 (2006.01)

(52) U.S. Cl. ............ 345/629; 345/419; 345/420; 345/619; 345/424; 345/423; 600/416; 600/407

(58) Field of Classification Search ......... 345/629–641
See application file for complete search history.

(56) References Cited

U.S. PATENT DOCUMENTS

| 6,487,565 B1* | 11/2002 | Schechter et al. ....... 715/500.1 |
| 6,750,841 B2* | 6/2004 | Itoh et al. ................. 345/100 |
| 2002/0089508 A1* | 7/2002 | Sowizral et al. .......... 345/522 |
| 2002/0190994 A1* | 12/2002 | Brown ..................... 345/539 |

OTHER PUBLICATIONS

"Performance of a Software MPEG Video Decoder", K. Patel et. al., 1993.*
"Adventures in Building the Stony Brook Video Server", M. Vernick et. al., 1996.*

* cited by examiner

*Primary Examiner*—Ulka Chauhan
*Assistant Examiner*—Eric Woods
(74) *Attorney, Agent, or Firm*—Kramer, Levin, Naftalis & Frankel LLP

(57) ABSTRACT

A method of rendering a graphics image in which rendering is only carried out in a region to be changed is disclosed. In a preferred form the image includes a plurality of objects and the method comprises the steps of: determining if each object has changed so that the object is required to be displayed differently in a subsequent frame; determining a bounding region of each changed object in the subsequent frame; determining a bounding region of each changed object in a frame prior to the subsequent frame; and combining the bounding regions to form an aggregate region and rendering the image only within the aggregate region.

26 Claims, 7 Drawing Sheets

Back Buffer

Front Buffer

Fig. 1

Back Buffer

Front Buffer

Fig. 2a

Back Buffer

Front Buffer

Fig. 2b

Back Buffer

Front Buffer

Fig. 2c

Back Buffer

Front Buffer

Fig. 2d

Back Buffer

Front Buffer

Fig. 2e

Back Buffer

Front Buffer

Fig. 2f

METHOD OF RENDERING A GRAPHICS IMAGE

This application is the national stage filing of corresponding international application number PCT/SG00/00200, filed Dec. 22, 2000.

BACKGROUND AND FIELD OF THE INVENTION

This invention relates to the field of three dimensional (3D) computer graphics systems. More particularly, but not exclusively, this invention relates to generation of images in real time for graphics systems with limited fill-rate capabilities.

A three dimensional computer graphics system generates projections of 3D computer models on a device known as a frame buffer. In order to generate a projection of a 3D model, the system relies on software and hardware to process the 3D model and calculate the colour of each pixel in the frame buffer. In interactive real-time applications, where a user manipulates the 3D model and expects 'instant' reactions to his/her inputs, this processing of the entire 3D model needs to happen at least 10 times per second. If the model is displayed in an stereoscopic display, two images are required, one per eye, which results in processing speeds of 20 times per second.

In medical and scientific applications, the system needs to ensure that the original high quality and fine detail of the images (CT and/or MRI scans, for example) results in a high quality display. This requires a frame buffer that has as many resolvable pixels as possible. Frame buffer sizes of 1280× 1024 are common today. The hardware that drives the frame buffer is required to calculate the colour of each of the 1,310,720 pixels 20 times per second, or 26,214,400 pixel operations per second. This fill-rate operation is one of the key limiting factors of the speed at which a 3D model can be rendered, and therefore imposes a limit on the interactivity that the user can have with the 3D model. If the entire 3D model moves (is rotated or scaled) then the entire frame buffer needs to be recomputed and updated. If the 3D model changes (its components change over time), then the frame buffer also needs complete recomputation and updating.

It is an object of the invention to provide a method of generating a 3D image which alleviates this problem of the prior art.

SUMMARY OF THE INVENTION

According to the invention there is provided a method of rendering a graphic image comprising the steps of determining a region of the image that is to be changed and rendering the image only in that region.

Preferably, the image including a plurality of objects and the method further comprises the steps of: determining if each object has changed so that the object is required to be displayed differently in a subsequent frame;

determining a bounding region of each changed object in the subsequent frame;

determining a bounding region of each changed object in a frame prior to the subsequent frame; and combining the bounding regions to form an aggregate region and rendering the image only within the aggregate region.

Preferably a flag is associated with each object, the flag being set when the object is changed and the change in the object being determined with reference to the flag.

Preferably the bounding regions are rectangular in shape.

Preferably the method uses a double buffering technique having a front buffer and a back buffer and wherein said bounding region of objects changed in a frame prior to the subsequent frame is formed of objects changed two frames prior to the subsequent frame.

The bounding region of objects changed in a frame prior to the subsequent frame may alternatively be of objects changed one frame prior to the subsequent frame.

The aggregate regions may be a unitary region encompassing the bounding regions or a simple grouping of the bounding regions.

The described embodiment of the invention was conceived following the realisation by the inventors that there are many 3D interactive applications in which the user modifies a small part of the 3D model while keeping in view the surrounding part of the model, to provide context and give a visual reference of where other objects are located, relative to the area of interest. Examples of this are virtual surgery, where the surgeon concentrates on operating on a small bone or tissue while the entire screen is covered with the anatomical context where the operation is taking place and virtual sculpting, where a fine detail is carved that makes sense as part and proportion to the whole sculpture being developed. A further example is in scientific applications, when a 3D structure is being "segmented" out of a larger part (say a tumor out of a brain); while concentrating on the edges of the segment, it is important to realize the position of the edge with respect to the surrounding tissue. The described embodiment essentially determines the area within the scene that will be changed and restricts rendering only to that area.

BRIEF DESCRIPTION OF THE DRAWINGS

An embodiment of the invention will now be described by way of example with reference to the accompanying drawings in which.

DETAILED DESCRIPTION OF THE PREFERRED EMBODIMENT

Figure 1:
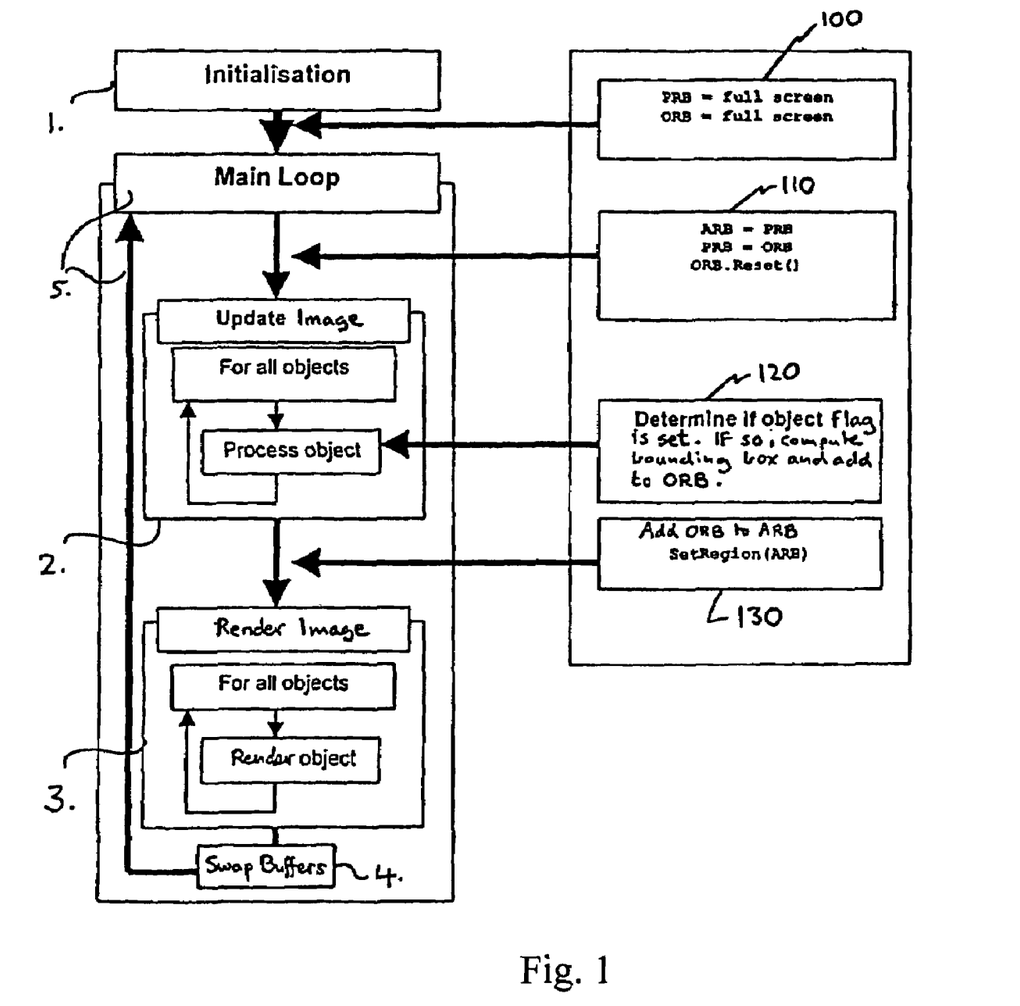
FIG. 1 illustrates the method of the described embodiment of the invention applied to a graphics application framework.

The embodiment to be described is applicable for use with a 3D computer graphics application which operates in the following framework which is shown in FIG. 1:
1. Initialisation
2. Updating (Input and scene processing)
3. Rendering
4. Buffer Swap
5. Loop (to step 2)

The described embodiment uses two known graphics processing techniques namely double buffering and scissoring. Double buffering is a technique for displaying animating computer graphics without artifacts such as tearing or snows. It employs two buffers, one for displaying to the screen (called the front buffer) and another for drawing (called the back buffer). When the drawing is done, the buffers can be switched such that the back buffer has the role of displaying to the screen (becomes the front buffer) and the front buffer becomes the drawing board for any subsequent rendering. This technique is called page flipping. Alternatively, a high speed transfer of the content of the back buffer to the front buffer may be made. This is called bit block transfer (bitblt). The front buffer is defined as the display buffer that is currently being displayed on the screen. The back buffer is defined as the display buffer that is currently being rendered to (or being changed). Buffer swapping is the process by which the content back buffer is displayed, either by page flipping or bitblt. Scissoring is the definition of a rectangular area on the screen within which rendering is allowed. Drawing outside the region will be clipped away. When doing a screen clear, only the scissored region will be cleared.

Step 1 Initialisation

This step initialises the application's variables and state. In a 3D application, this involves the setting up of the graphics screen (getting the correct resolution and color depth) and context (initialisation of the graphics software).

Step 2 Input and Scene Processing

For interactive applications, external inputs usually result in changes to the scene. The scene is made up of a plurality of displayed objects, the term object in this context referring to the abstraction of an object that the application has to process and display. This may encapsulate data, functions and hierarchy. For example, data would consist of the vertices that define the shape of the object as well as the 3D position, orientation and size. Example of a function is SetPosition( ). This would change the 3D position of the object.

Scene processing is usually the result of input processing. For example, if a mouse were to move a cube on the screen, processing the mouse signals would result in the scene being processed (the cube being moved). Input processing can either be in the form of message handling or polling.

Step 3 Scene Display

This step involves scene post-processing (such as polygon sorting) and scene realisation (using the graphics software to render the scene on the back buffer).

Step 4 Buffer Swap

The buffers are swapped to enable the newly processed scene to be displayed.

Step 5 Loop Back (Go to Step 2)

This framework runs in an infinite loop (steps 2-4), with each loop constituting a frame. For benchmarking purposes, the unit is in frames per second, meaning the number of loops the application goes through in a second. Thus the higher the frame rate, the more interactive or responsive the program is.

The present method defines the minimum area that the graphics software needs to render so as to reduce the fill rate requirement for an interactive experience. This minimum area is hereinafter referred to as the Aggregate Region. To minimise the changes needed to implement the method into an existing framework, a flag is added to all objects. This flag, called the _moveFlag, is set if the object has been changed and thus is required to be displayed differently from the previous frame.

A function is provided that computes the 2D bounding box of the projection of an object to the screen (a rectangular enclosure for the object). The method concatenates all the bounding boxes of the objects that have been changed during the processing stage. This resulting area is hereinafter referred to as the Object Region. The Object Region constitutes part of the Aggregate Region.

The Object Region includes the bounding boxes of all the objects which have been changed, the bounding boxes surrounding the new position of the objects. In order to establish the minimum area in which rendering is needed, it is necessary to include not only the bounding boxes of new object data but also bounding boxes for the old. For example, if an object moves from one point to another, it is necessary to draw the object in the new point but remove the object at the old point.

For a graphic system using a buffer swapping technique as described above, when new data is displayed in a current frame, data from the previous frame is swapped to the back buffer. Thus, the position and detail of objects in the back buffer is that of the previous frame. If this is intended to change the position of an object for a subsequent frame, the new position of the object will be rendered on the back buffer. However, as the data currently in the back buffer would include object data of the previous frame, it is this data which needs to be removed. It is thus necessary to calculate a further region of all those objects the positions of which changed in the previous frame and add this to the Aggregate Region.

The described embodiment uses three Region Buffers (stored rectangular regions in the screen coordinates) termed ARB, ORB and PRB. The ARB stores the Aggregate Region, the final bounding box against which the graphics software clips the image. The ORB will store the current Object Region. And the PRB will store the Previous Object Region.

The steps of the method are:

1. Initialise PRB=ARB=the full screen area.
2. Copy PRB to ARB so that ARB contains the Object Region from the last frame.
3. Next, copy ORB to PRB. PRB now holds the Object Region from the current frame.
4. Set ORB to define no area. Check all the objects again, if the object's _moveFlag has been set, its bounding box is computed and added to ORB. In the end, ORB will contain the Object Region for the next frame.
5. Add ORB to ARB so that ARB now contains the bounding boxes of all the objects that have changed before the change and after the change.
6. Clip the region defined by ARB using the graphics software so that rendering is constrained to a corresponding proportion of the screen.
7. Swap buffers to display the next frame.
8. Go to 2.

With reference to FIG. 2, a simple example of the method is illustrated. In this example, a black ball (object A which at various positions is denoted by $A^1$-$A^4$) appears on the screen and moves to four different positions before disappearing. Each of FIGS. 2a-2f shows the state of the back buffer and the front buffer during the Render Image step 3 of FIG. 1. In the figures, a solid black object indicates an object rendered in the current frame. A solid grey object indicates an object rendered two frames previously, which appears on the back buffer due to a previous buffer swap and a box illustrates the position of a bounding box of one or more objects. These objects/boxes are shown together on the back buffer for ease of illustration although it will be apparent to one skilled in the art that the images of the objects will not appear physically on the back buffer at the same time, but at different times during the Render Image step and the boxes only illustrate the positions of the bounding boxes held by the relevant buffers.

With reference to FIG. 1, on initialisation, the region buffers PRB and ORB are set to the full screen area (the default) at block 100. The program then enters main loop 5. The region buffer ARB is set to PRB (this is done at an intermediate point in time referred to as ARB'), and the region buffer PRB is then set to ORB, so at this point, all three buffers are full screen. The buffer ORB is then reset to define no area, at step 110. The image is then updated and at step 120 it is determined if the object flag has been set for each object and if so, a bounding box for that object is computed and added to ORB. At step 130, ORB is then added to ARB and a scissoring function Set Region (ARB) is then invoked to limited subsequent rendering to the region defined by region buffer ARB at step 130.

The rendering is then performed for all objects within the scissored region.

Figure 2A:
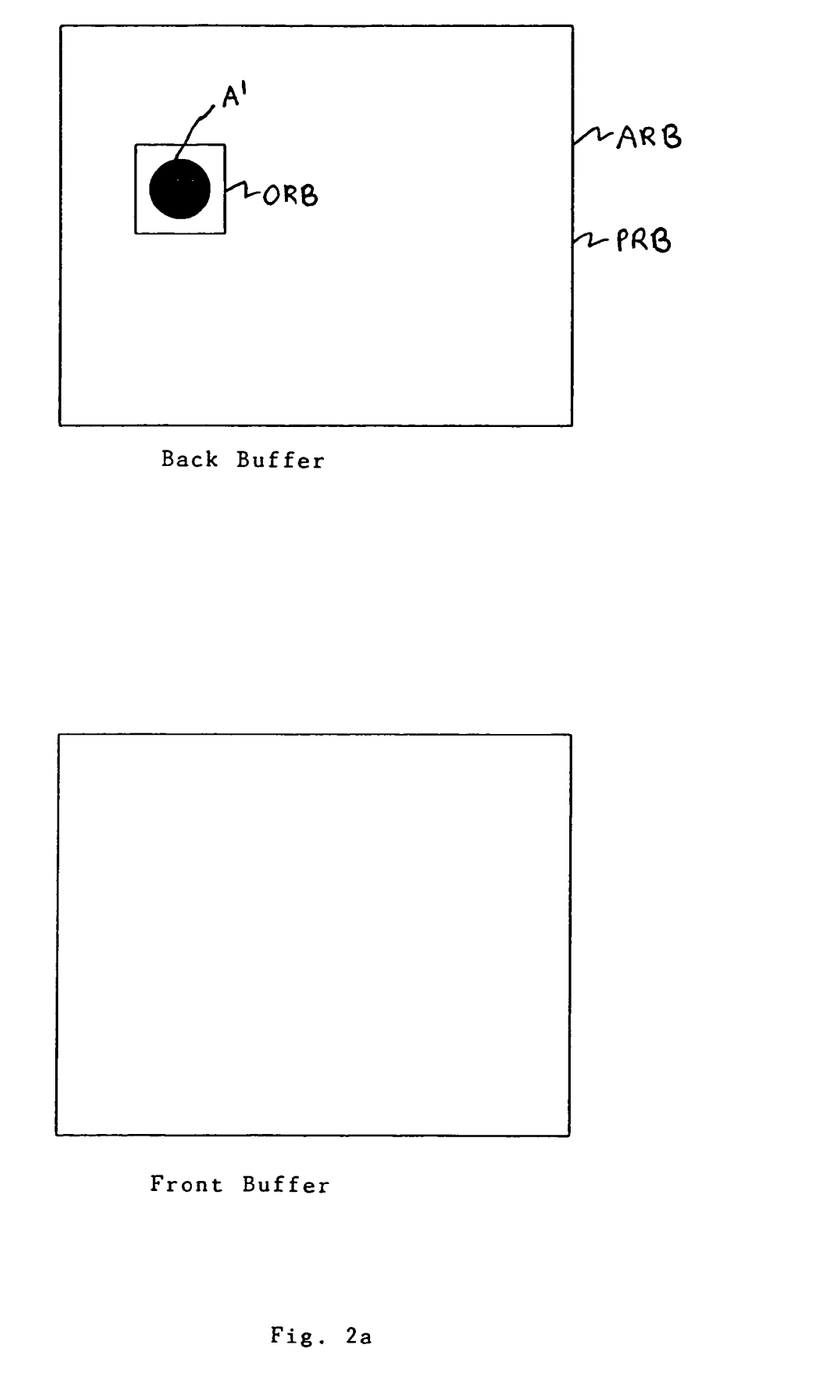
FIGS. 2a-f shows the method in operation for rendering a simple scene.

The buffers at this point are shown in FIG. 2a. The front buffer is blank (the initialisation default). The buffer PRB and ARB are full screen size. Object $A^1$, since its object flag was set, has a bounding box which is added to ORB. Since ORB is fully enclosed within ARB, the full screen is rendered in this first step.

The buffers are then swapped at step 4 so that the object $A^1$ now appears on the front buffer. The program then follows the main loop and, again, at step 110 ARB' is set to PRB, which is still the full screen area. The buffer PRB is set to ORB, so that is now contains the region buffer of the object $A^1$ which was processed in the previous frame and which now appears on the front buffer. ORB is then reset and the images then updated. This time the position of object $A^2$ has moved to the right and its object flag is consequently set and the bounding box for the object is established and added to ORB at step 120. ORB is added to ARB' at step 130 to form ALRB but, again, since ARB is still the full screen area, this does not yet reduce the size of ARB.

Figure 2B:
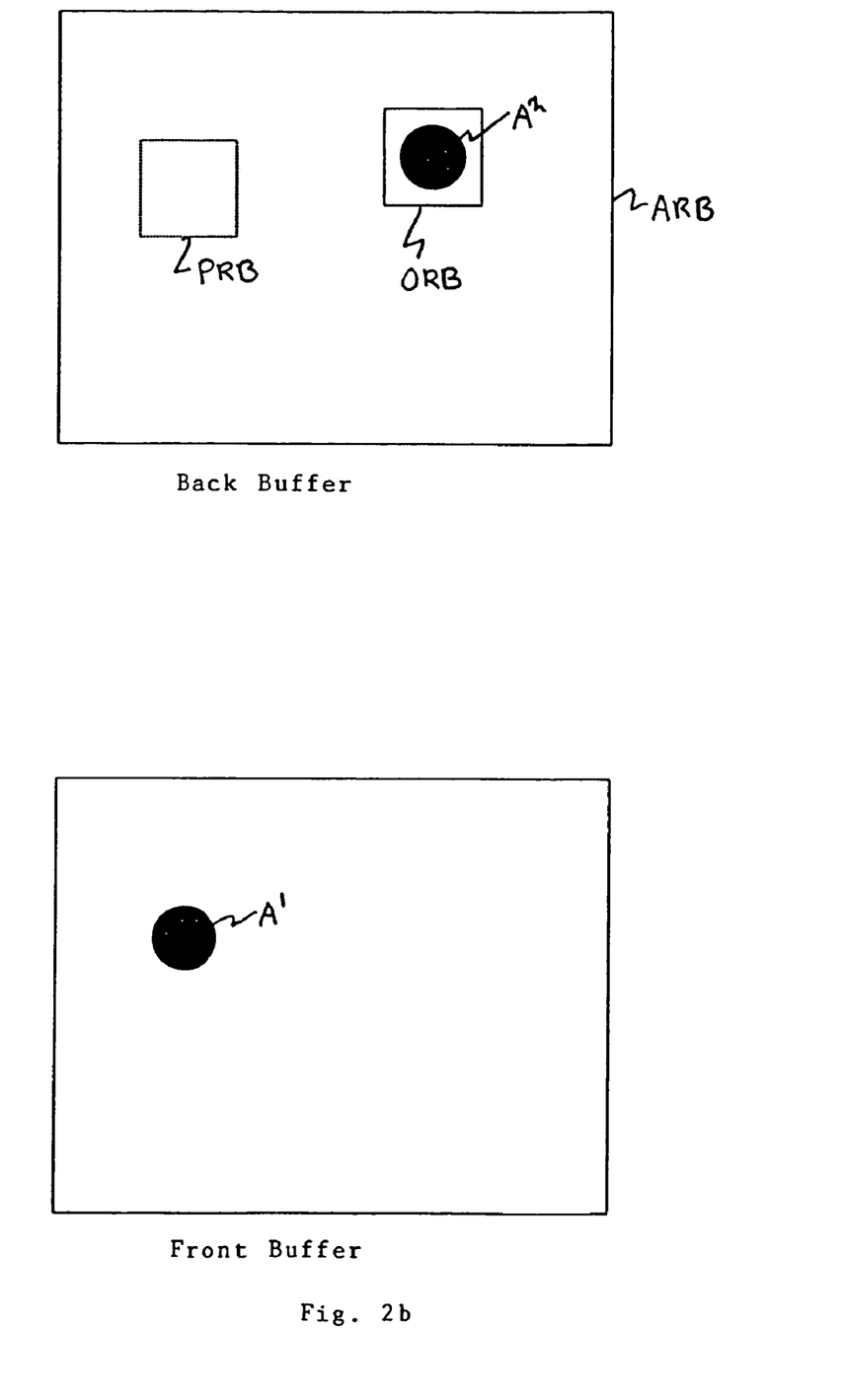

Rendering then takes place again at step 3 for the full screen area leading to the position shown in FIG. 2b in which the front buffer contain the current image $A^1$ and the back buffer contain the next image $A^2$.

Figure 2C:
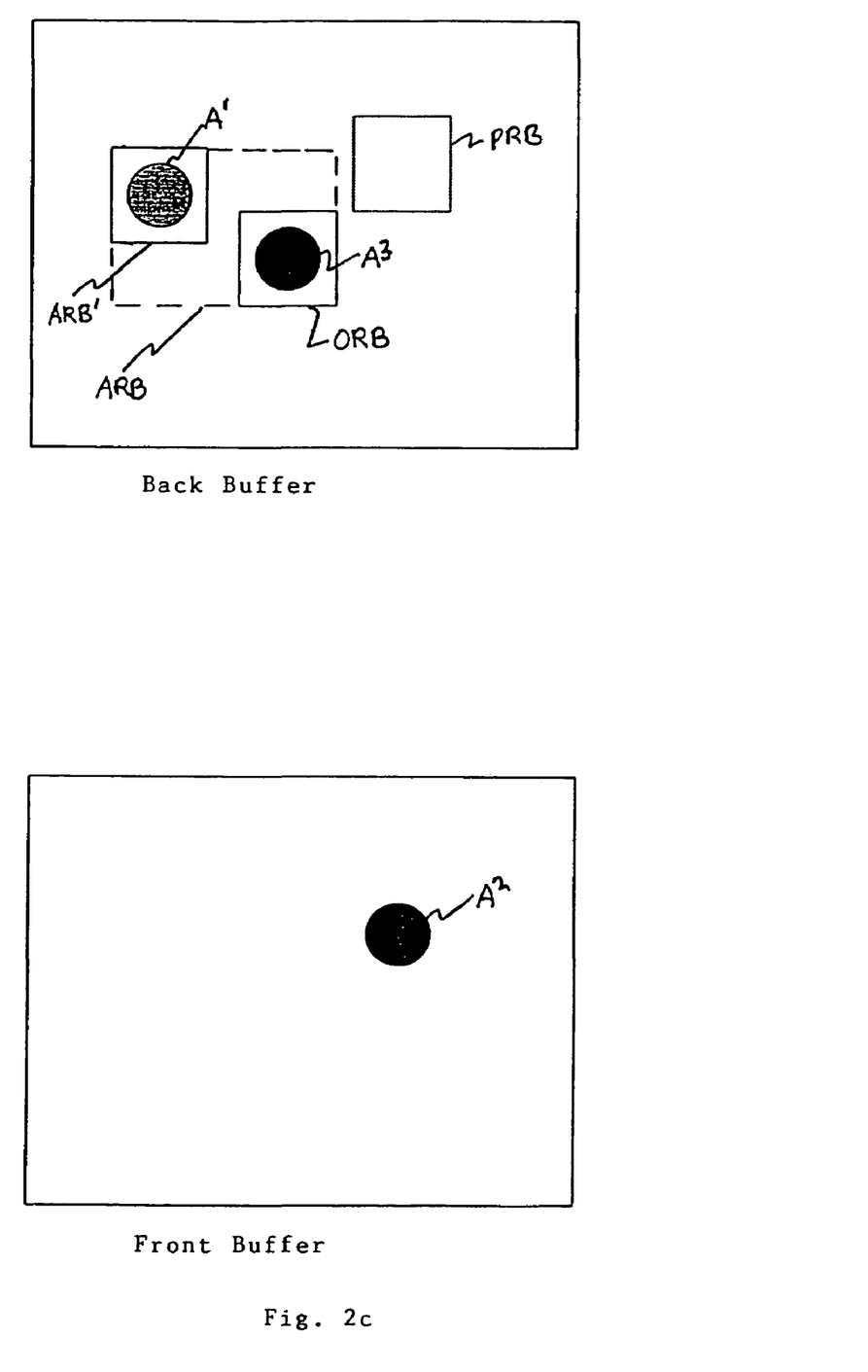

The buffers are now swapped so that object $A^2$ now appears on the front buffer and object $A^1$ previously on the front buffer is now on the back buffer. At step 110, ARB' is now set to PRB which, with reference to FIG. 2b is at the position of object $A^1$ swapped from the front buffer. PRB is set to ORB, the position of object $A^2$, and ORB is reset. Object A then moves to a position denoted by $A^3$ and since the object flag is set, a bounding box is calculated and added to ORB. Step 130 ORB is added to ARB' to form the final ARB, shown in phantom lines as an enlarged bounding box including ARB' and ORB. Rendering is now performed within the region ARB only, to remove of image $A^1$ from the back buffer and add image $A^3$ as shown in FIG. 2c.

Figure 2D:
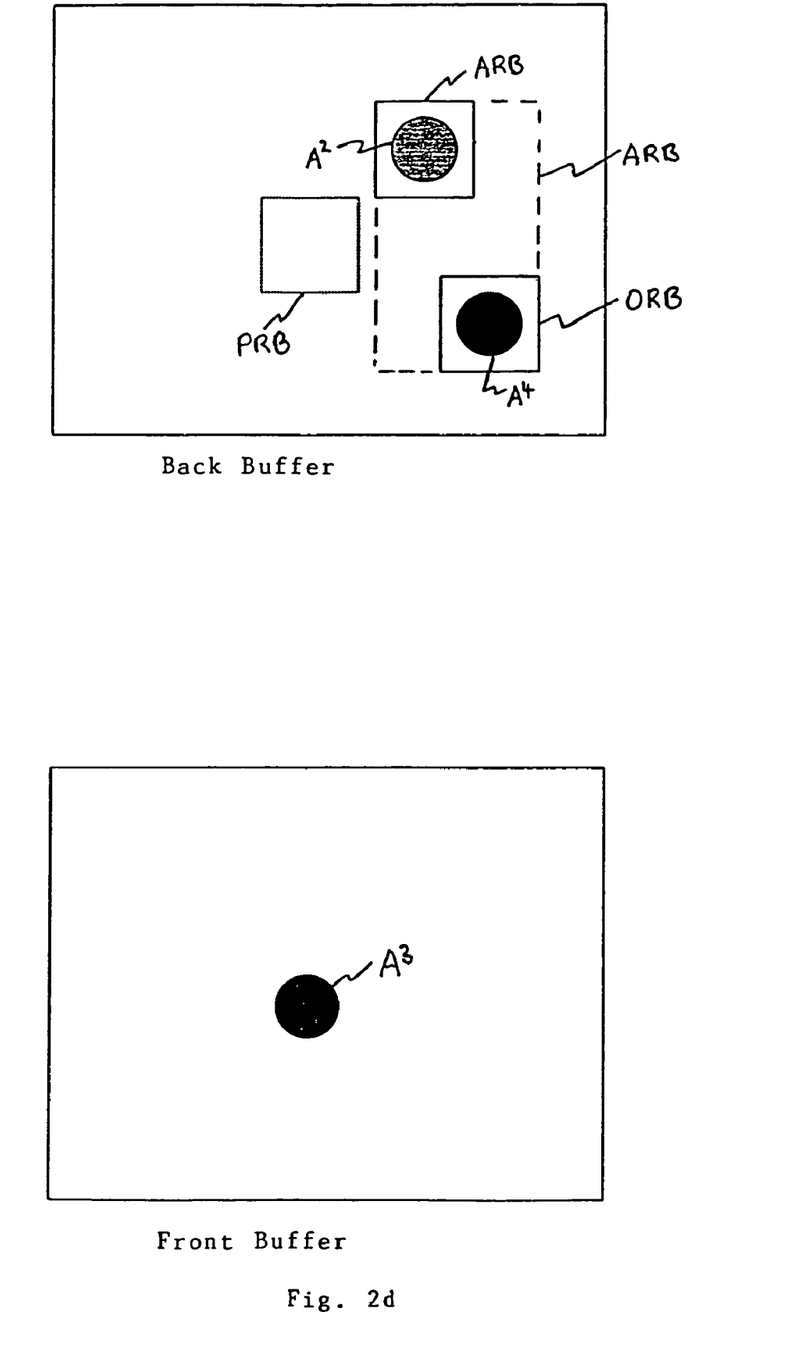

The buffers are then swapped so that image $A^3$ appears on the front buffer. The buffer ARB' is then set, initially, to PRB (shown in FIG. 2c). PRB is then set to ORB and ORB is reset. The object A now moves to position denoted by $A^4$ at the bottom right hand corner of the screen. Its flag is set and thus a bounding box is computed which becomes ORB. ORB is then added to ARB' to form the final ARB as shown by phantom lines. Rendering is then performed for all objects within area ARB to remove the previous image $A^2$ and add the new image $A^4$ as shown in FIG. 2d.

Figure 2E:
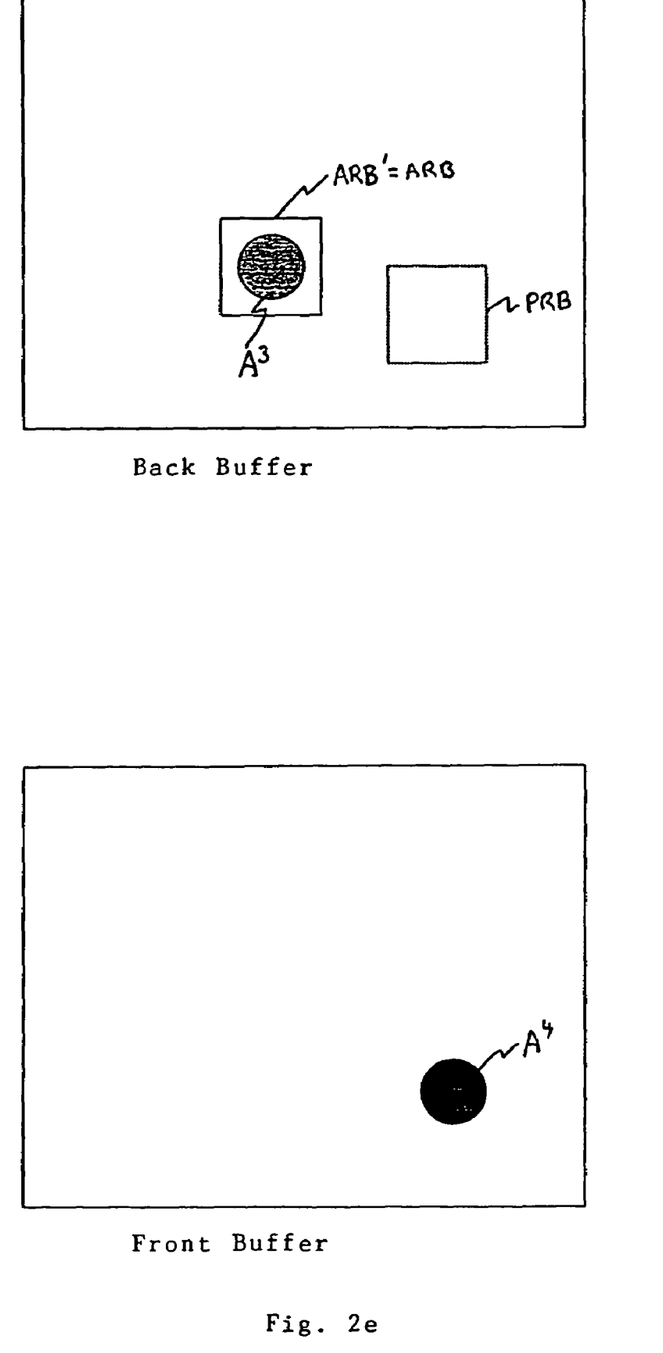

The buffers are then swapped. ARB' is set to PRB. PRB is set to ORB and ORB is reset at step 110. This time the object disappeared. Although its object flag is set, since the object has disappears there is no bounding box and thus nothing is added to ORB. ARB is thus equal to ARB' and this region is set at step 130. Rendering then take place only for the smaller region ARB to remove the image $A.sup.3$ as shown in FIG. 2e.

Figure 2F:
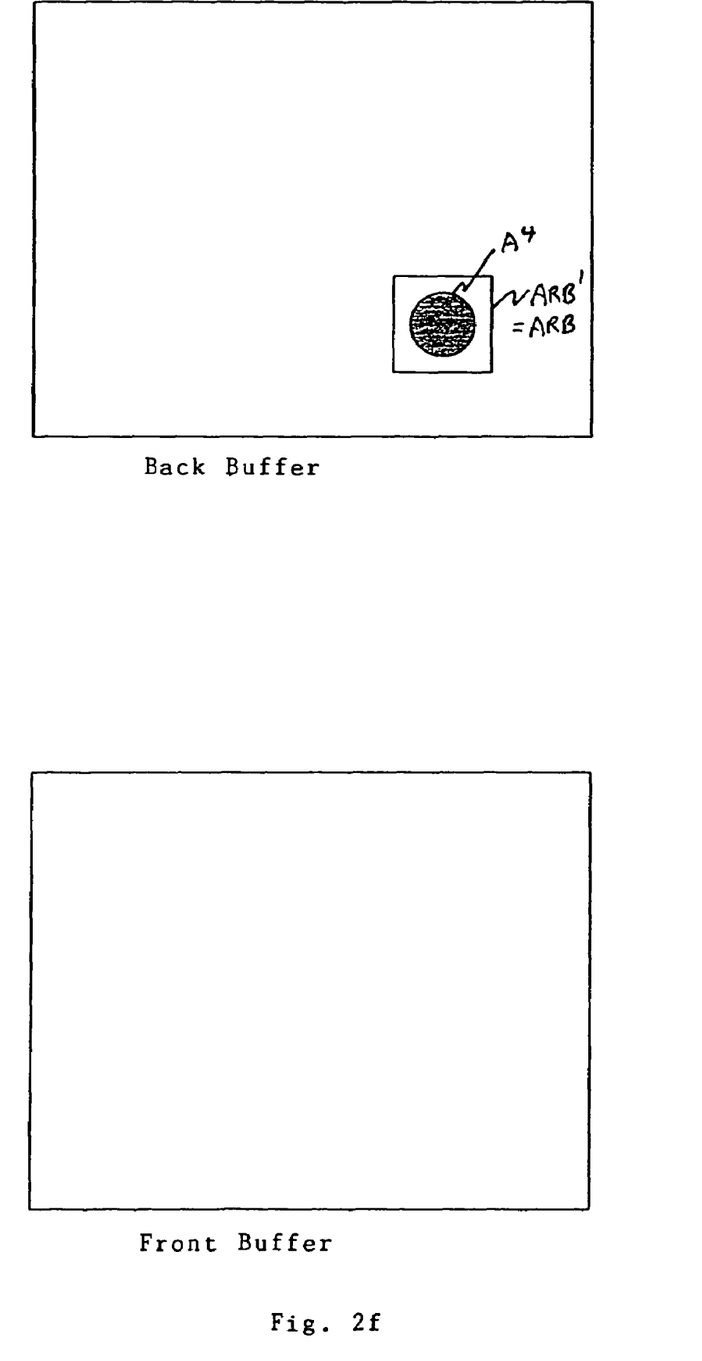

The buffers are then swapped to on the back buffer, ARB' is set initially to PRB. No new objects are added or moved so at step 120 no object flag is set. At step 130, since ORB is 0, nothing is added to ARB' to form ARB and rendering is then performed to remove the image $A^4$ to leave the back buffer blank as shown in FIG. 2f.

This simple example shows only a movement of a single object but the technique, generally, applies to multiple objects and for all those objects with the object flags set, the buffer ORB holds a final bounding box around all the changed objects.

For such situation where an existing object on the screen is moved or changed, in order to commence a move or change, that object is selected, (for example by having the cursor pressed on the object and then clicking with the mouse button or 3D joystick). This first "click" does not move the object but records and renders the initial position, the object then being moved subsequently. This does provide a slight delay in movement but this is not noticeable. In the case of an "animation" in which objects move by themselves, then the very first position of an object's past is essentially repeated this analogous to the "highlight" click as previously mentioned to allow a rendering of the initial position of the object.

The described embodiment is not to be constituted as limitative. For example, although the method has been described with reference to a graphics rendering framework which uses a double buffering technique, the invention is equally applicable to use with graphics software which displays graphics images using a single buffer. In such a case, the previous region buffer PRB stores detail of images changed in the current frame, rather than the previous frame.

Although the bounding regions computed in the method are bounding boxes, that is to say of generally rectangular configuration, this is not to be constituted as limitative and bounding regions of any configuration may be used, for example ones which follow more closely the boundary of the objects enclosed. Furthermore, the bounding regions of individual objects before and after a change need not be combined into a unitary aggregate bounding region but may be a group of discrete regions, with the rendering then being carried out on the group thus reducing rendering area further.

An example of suitable pseudocode to perform the method described, in a double buffering framework is given below:

Class Definitions:

```
class RegionBuffer {
public:
    integer _left;
    integer _right;
    integer _bottom;
    integer _top;
    // . . . constructors, destructors etc
    void Reset( );
    void operator=(const Region_Buffer& b);
    void operator+=(const Region_Buffer& b);
};
There are three operations used on Region Buffers:
void Reset( )
{
    // resets the region to be minimum.
    _left = __MAXIMUM_VALUE__;
    _right = __MINIMUM_VALUE__;
    _top = __MINIMUM_VALUE__;
    _bottom = __MAXIMUM_VALUE__;
}
```

-continued

```
void operator=(const Region_Buffer& b)
{
    // sets the region to that of Region Buffer b.
    _left = b._left;
    _right = b._right;
    _top = b._top;
    _bottom = b._bottom;
}
void operator+=(const Region_Buffer& b)
{
    // merges the region of Region Buffer b.
    _left = MINIMUM(_left, b._left);
    _right = MAXIMUM(_right, b._right);
    _top = MAXIMUM(_top, b._top);
    _bottom = MINIMUM(_bottom, b._bottom);
}
class Object {
public:
    Boolean _moveFlag;
    RegionBuffer _boundingBox2D;
};
// Global variables
RegionBuffer ARB, PRB, ORB;
Program entry point
main( )
{
    // set up variables and states, create objects
    Initialisation( );
    // initialise to cover whole screen
    ARB = PRB = ORB = fullscreen;
    // the forever loop
    While (TRUE)
    {
        ARB = PRB;
        PRB = ORB;
        ORB.Reset( ); // ORB covers no area
        for (all objects)
               object._moveFlag = FALSE;
        // Objects will change state
        // e.g., pressing an arrow key will directly
        // move an object
        ProcessObjects( );
        // in the Object processing stage
        // if an object's state is changed, its _moveFlag is set
        for (all objects)
        {
            if (object._moveFlag = TRUE)
                ORB += object._boundingBox2D;
        }
        ARB += ORB;
        // Configure the graphics software to render only within
        ARB
        SetRegion(ARB);
        // objects are displayed using the graphics software
        RenderObjects( );
        SwapBuffers( );
    }
}
```

The invention claimed is:

1. A method of interactively rendering a graphics image comprising:

providing an image that includes objects, said objects being 2D projections of one or more 3D objects;

displaying a current frame of the image;

receiving user input regarding changes to be made to the image;

determining from said user input, as to each object in the image, if the object is to be changed and thus displayed differently in a next frame;

determining a first bounding region of each changed object, said first bounding region containing the object's position in a previous frame;

determining a second bounding region of each changed object, said second bounding region containing the object's position in the next frame;

adding the first and second bounding regions to an aggregate region; and rendering the image only within the aggregate region, wherein a front buffer is used to display the current frame, a back buffer is used to store objects as displayed in the previous frame and changes to objects from the current frame for display in the next frame, wherein the roles of front and back buffers are switched after each frame display, and wherein each of the first and second bounding regions and the aggregate region are stored in a separate data structure from the front or the back buffers.

2. A method as claimed in claim 1 wherein a flag is associated with each object, the flag being set when the object is to be changed and the change in the object being determined with reference to the flag.

3. A method as claimed in claim 1 or claim 2 wherein at least one of the first and second bounding regions are rectangular in shape.

4. A method as claimed in either of claim 1 or claim 2, wherein the aggregate region comprises a unitary region encompassing the first and second bounding regions.

5. A method as claimed in claim 1 or claim 2 wherein the aggregate region comprises a grouping of the bounding regions for all changed objects.

6. A method as claimed in claim 3 wherein the aggregate region comprises a unitary region encompassing the bounding regions.

7. A method as claimed in claim 3 wherein the aggregate region comprises a grouping of the bounding regions for all changed objects.

8. The method of claim 1, wherein after the first bounding region has been added to the aggregate region the first bounding region is set equal to the second bounding region for a next iteration.

9. The method of claim 1, wherein the process repeats as long as a user interacts with the image or the dataset which it is a part of.

10. The method of claim 8, wherein the process repeats as long as a user interacts with the image or the dataset which it is a part of.

11. The method of claim 1, wherein the objects are segmented from imaging scans of a human or animal body.

12. The method of claim 8, wherein the objects are segmented from imaging scans of a human or animal body.

13. The method of claim 1, used to perform surgical planning or virtual surgery.

14. The method of claim 8, used to perform surgical planning or virtual surgery.

15. The method of claim 1, wherein the first bounding region, the second bounding region and the aggregate region store regions in screen co-ordinates.

16. The method of claim 15, where the regions are rectangular.

17. A system for interactively rendering a graphics image, comprising:

a computing system;

a display coupled to the computing system; and one or more user input devices, wherein the computing system includes a central processing unit and a memory; the memory containing machine programmable code to be executed by the central processing unit, the machine programmable code including instructions to:

provide an image that includes objects, said objects being 2D projections of one or more 3D objects;

display a current frame of the image;

receive user input regarding changes to be made to the image;

determining from said user input, as to each object in the image, if the object is to be changed and thus displayed differently in the next frame;

determining a first bounding region of each changed object, said first bounding region containing the object's position in the previous frame;

determining a second bounding region of each changed object, said second bounding region containing the object's position in the next frame;

adding the first and second bounding regions to an aggregate region; and rendering the image only within the aggregate region, wherein a front buffer is used to display the current frame, a back buffer is used to store objects as displayed in the previous frame and changes to objects from the current frame for display in the next frame, wherein the roles of front and back buffers are switched after each frame display, and wherein each of the first and second bounding regions and the aggregate region are stored in a separate data structure from the front or the back buffers.

18. The system of claim 17, wherein the wherein at least one of the first and second bounding regions are rectangular in shape.

19. The system of claim 17, wherein at least one of the first and second bounding regions are closed curves.

20. The method of claim 1, wherein at least one of the first and second bounding regions are closed curves.

21. The system of claim 17, wherein after the first bounding region has been added to the aggregate region the first bounding region is set equal to the second bounding region for a next iteration.

22. The system of claim 17, wherein the process repeats as long as a user interacts with the image or the dataset which it is a part of.

23. The system of claim 21, wherein the process repeats as long as a user interacts with the image or the dataset which it is a part of.

24. The system of claim 17, wherein the objects are segmented from imaging scans of a human or animal body.

25. The system of claim 17, used to perform surgical planning or virtual surgery.

26. The system of claim 17, wherein the first bounding region, the second bounding region and the aggregate region store regions in screen co-ordinates.

* * * * *